(12) United States Patent
Kawamura et al.

(10) Patent No.: US 7,680,564 B2
(45) Date of Patent: Mar. 16, 2010

(54) LEISURE VEHICLE

(75) Inventors: Naoki Kawamura, Takasago (JP); Satoru Watabe, Akashi (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 783 days.

(21) Appl. No.: 11/522,121

(22) Filed: Sep. 14, 2006

(65) Prior Publication Data
US 2007/0075845 A1 Apr. 5, 2007

(30) Foreign Application Priority Data
Sep. 15, 2005 (JP) ............................. 2005-268739

(51) Int. Cl.
*H04L 11/00* (2006.01)
*G06F 19/00* (2006.01)

(52) U.S. Cl. ............................. 701/1; 307/10.1; 370/438

(58) Field of Classification Search ................... 701/1, 701/36; 307/9.1, 10.1, 147; 455/517; 340/425.5, 340/459, 310.13, 825.16
See application file for complete search history.

(56) References Cited

U.S. PATENT DOCUMENTS 3,651,454 A * 3/1972 Venema et al. ............... 340/459
5,745,027 A * 4/1998 Malville ...................... 375/259
6,249,060 B1 * 6/2001 Osha .......................... 307/10.1
6,469,404 B1 * 10/2002 Pohjola ...................... 307/10.1
6,842,108 B2 * 1/2005 Akiyama et al. ........ 340/310.11

FOREIGN PATENT DOCUMENTS

| EP | 0739780 | 10/1996 |
|---|---|---|
| EP | 0968884 | 1/2000 |
| GB | 784421 | 10/1957 |
| JP | 61-066436 | 4/1986 |
| JP | 2004241998 | 8/2004 |
| JP | 2004262344 | 9/2004 |
| JP | 2006182315 | 7/2006 |

OTHER PUBLICATIONS

ESA EPO; European Search Report of EP06254814; Jan. 7, 2009; Den Haag, AN.

* cited by examiner

*Primary Examiner*—Tan Q. Nguyen
(74) *Attorney, Agent, or Firm*—Alleman Hall McCoy Russell & Tuttle LLP (57) ABSTRACT

A leisure vehicle including a plurality of communication devices built into a vehicle body of the leisure vehicle; and a multiplex communication line through which the plurality of communication devices are coupled to each other. The communication devices are configured to perform multiplexed data communication through the multiplex communication line. The multiplex communication line is positioned a distance apart from a noise source mounted in the vehicle body so as not to be subjected to a noise.

16 Claims, 5 Drawing Sheets

LEISURE VEHICLE

TECHNICAL FIELD

The present invention relates to a leisure vehicle such as a motorcycle, a personal watercraft (PWC) or an all terrain vehicle (ATV) which is equipped with a multiplex communication line which allows multiplex communication between communication devices mounted in the leisure vehicle.

BACKGROUND ART

In leisure vehicles such as a motorcycle, an all terrain vehicle, or a personal watercraft, communication devices built into the vehicle are typically coupled to each other through serial communication lines. The serial communication lines increase in number as the communication devices mounted in the vehicle increase in number, causing a diameter of wiring harness to increase. In addition, it is necessary to equip a new communication line to incorporate a new communication device into the leisure vehicle. This results in a need for re-design of the harness and makes it difficult to improve system extensibility. For the purpose of reducing harness wires and improving the system extensibility, Japanese Laid-Open Patent Application Publication No. Sho. 61-66436 discloses a configuration in which a front controller disposed in a front side of a vehicle body of a motorcycle is coupled to a rear controller disposed under a seat through a multiplex transmission line and communication devices built into the vehicle body perform multiplexed data communication through the multiplex transmission line.

However, in the configuration disclosed in Japanese Laid-Open Patent Application Publication No. Sho. 61-66436, because wiring of the multiplex communication line is not specially devised, an electromagnetic wave noise is likely to enter the multiplex transmission line if in-vehicle noise sources such as a battery, a regulator, etc, are disposed in the vicinity of the multiplex transmission line, thus making it difficult to improve communication stability. Since multiplex communication is performed in such a manner that data is communicated between plural communication devices through one multiplex transmission line unlike in normal serial communication, entry of the noise may adversely affect plural communications.

SUMMARY OF THE INVENTION

The present invention addresses the above described problems, and an object of the present invention is to provide a leisure vehicle that is able to perform communication which is highly resistant to a noise while achieving reduced harness wires and improved system extensibility.

According to one aspect of the present invention, there is provided a leisure vehicle comprising a plurality of communication devices built into a vehicle body of the leisure vehicle; and a multiplex communication line through which the plurality of communication devices are coupled to each other; wherein the communication devices are configured to perform multiplexed data communication through the multiplex communication line; and wherein the multiplex communication line is positioned a distance apart from a noise source mounted in the vehicle body so as not to be subjected to a noise.

In such a construction, since the multiplex communication line is located distant from the noise source, communication that is resistant to the noise can be achieved. As a result, a suitable communication environment can be obtained. In addition, since the communication devices built into the vehicle body share the multiplex communication line to perform multiplexed data communication, the communication line does not substantially increase in number if the communication devices increase in number. As a result, harness wires can be reduced and system extensibility can be maintained. It should be understood that an electric wire, an optical fiber, etc. may be used as the multiplex communication line.

The distance between the multiplex communication line and the noise source may be 100 mm or more. This makes it possible to surely avoid influence of a high noise emitting source such as a regulator, on the multiplex communication line.

The multiplex communication line may be disposed on an opposite side of the noise source with respect to a center line in a width (lateral) direction of the vehicle body or on an opposite side of the noise source with respect to a center line in a vertical direction of the vehicle body.

To be specific, when the noise source is disposed on one of the right side and the left side with respect to the center line in the width direction or is disposed above or below the center line in the vertical direction, the multiplex communication line is disposed on the opposite side. Thereby, a suitable communication environment in which the multiplex communication line is distant from the noise source can be obtained.

The leisure vehicle may further comprise a noise shield member that is disposed between the multiplex communication line and the noise source and is located adjacent the multiplex communication line.

In such a construction, since an electromagnetic wave noise emitted from the noise source is surely shielded by the noise shield member and does not substantially affect the multiplex communication line, a suitable communication environment can be obtained.

The noise source may be a battery mounted in such a manner that a cathode is located more distant from the multiplex communication line than an anode.

In such a construction, since the battery is mounted in such a manner that the anode connected to the ground is located on the multiplex communication line side and the cathode is located distant from the multiplex communication line, influence of the noise on the multiplex communication line can be reduced. Electric wires may be respectively coupled to the cathode and the anode of the battery and may be respectively guided from the cathode and the anode so as to be away from the multiplex communication line. In such a construction, since the electric wires connected to the cathode and the anode are guided from the battery so as to be away from the multiplex communication line, a noise associated with the electric wires connected to the battery for feeding an electric power does not substantially affect the multiplex communication line.

The communication devices may include a front communication device mounted at a front portion of the vehicle body, a rear communication device that is mounted at a rear portion of the vehicle body, and an intermediate communication device disposed between the front communication device and the rear communication device, and the multiplex communication line may extend from the front portion of the vehicle body to the rear portion of the vehicle body between the front communication device and the rear communication device.

In such a construction, since the multiplex communication line coupling the front communication device to the rear communication device extends from the front portion of the vehicle body to the rear portion of the vehicle body, the intermediate communication devices arranged in the longitudinal direction of the vehicle body can be coupled to the multiplex communication line efficiently through short lines.

The front communication device may be a meter unit and the rear communication device may be an electronic control unit (ECU).

By positioning the ECU at the rear portion of the vehicle body, an extra space is formed in a middle portion of the vehicle body because of the absence of the ECU, and thus other components can be laid out flexibly. In addition, since the meter unit is used as the front communication device, the length of the multiplex communication line can be extended in the longitudinal direction between the meter unit and the ECU located at the rear portion of the vehicle body, and thus the intermediate communication device can be coupled to the multiplex communication line efficiently.

The rear communication device may be mounted in a space defined by a rear fender and a rear cover mounted above a rear wheel. In this construction, the rear communication device can be mounted at the rear portion of the vehicle body to be protected by the cover and the like.

According to another aspect of the present invention, there is provided a leisure vehicle comprising a plurality of communication devices built into a vehicle body of the leisure vehicle; and a multiplex communication line through which the plurality of communication devices are coupled to each other; wherein the communication devices are configured to perform multiplexed data communication through the multiplex communication line; and a noise shield member disposed between the multiplex communication line and a noise source mounted in the vehicle body.

In such a construction, since an electromagnetic wave noise emitted from the noise source is surely shielded by the noise shield member and does not substantially affect the multiplex communication line, a suitable communication environment can be obtained.

The noise source may be a battery and a portion of the multiplex communication line which is located in close proximity to the battery is surrounded by the noise shield member.

In such a construction, since the portion of the multiplex communication line is surrounded by the noise shield member, the shielding effect can be enhanced.

The noise shield member may be a vehicle body frame.

In such a construction, since the vehicle body frame serves as the noise shield member, the number of components does not substantially increase.

The above and further objects and features of the invention will more fully be apparent from the following detailed description with accompanying drawings.

DETAILED DESCRIPTION OF THE PREFERRED EMBODIMENTS

Hereinafter, an embodiment of a motorcycle of the present invention will be described with reference to the accompanying drawings. By way of example, a motorcycle will be described. As used herein, the direction is defined from the perspective of a rider (not shown) straddling the motorcycle.

Figure 1:
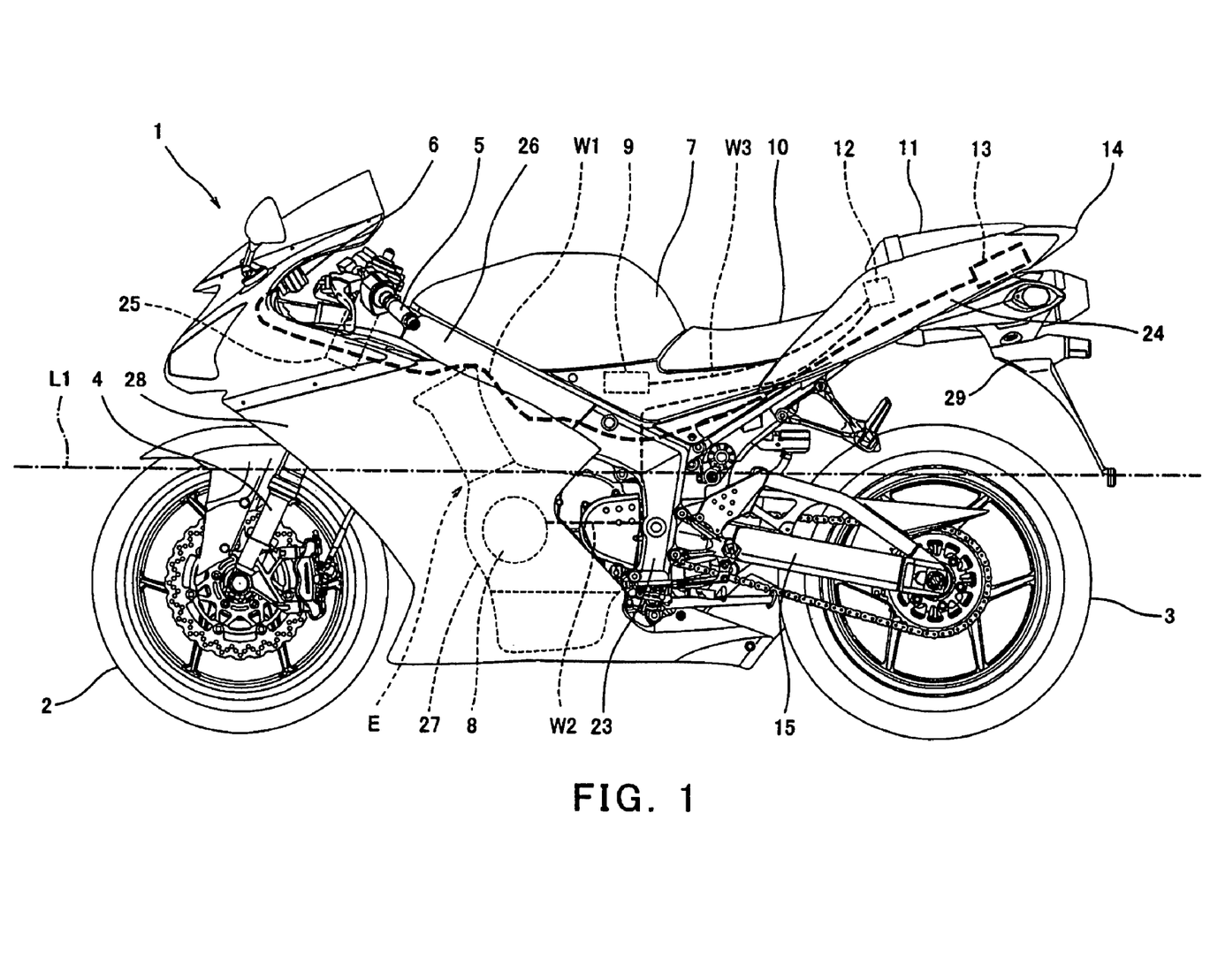
FIG. 1 is a side view of a motorcycle according to an embodiment of the present invention.
Figure 2:
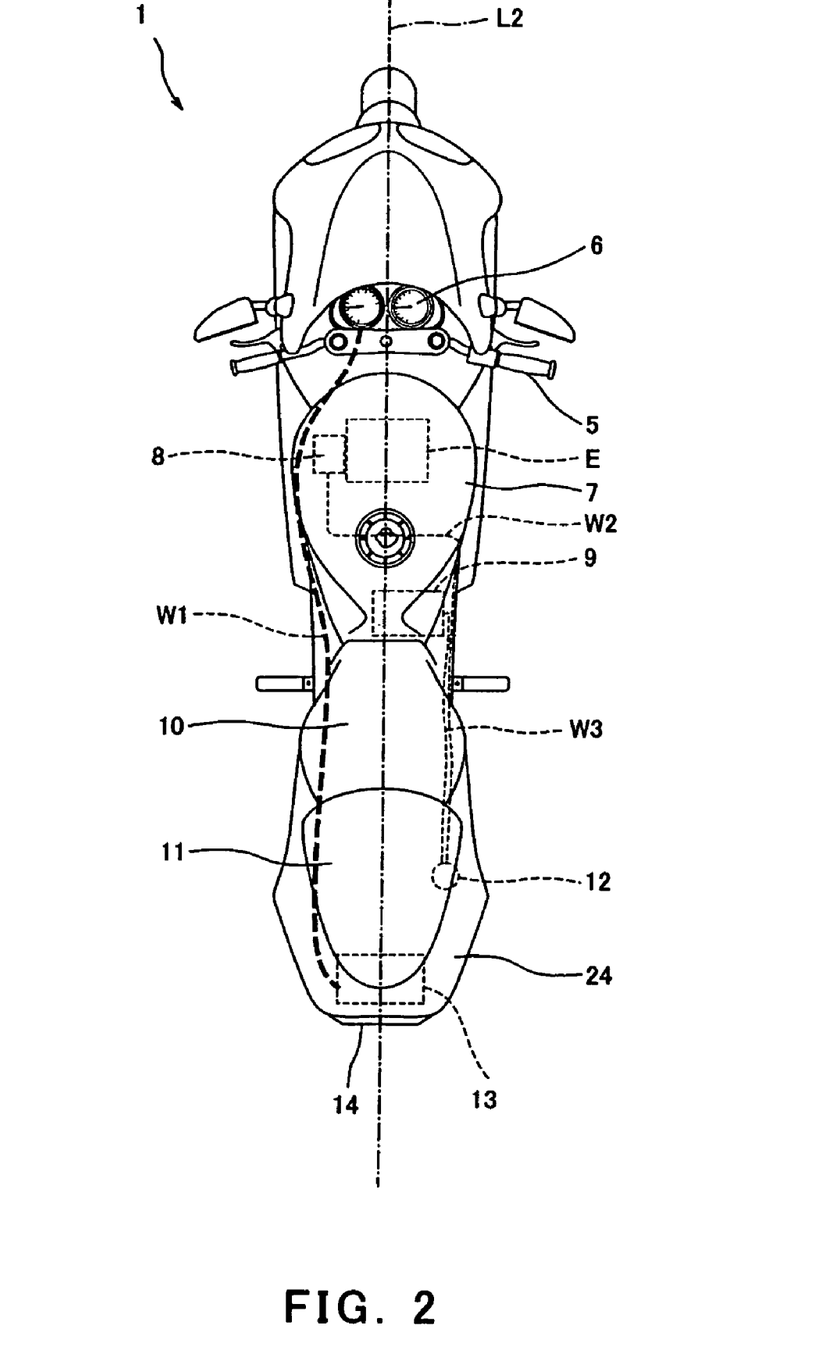
FIG. 2 is a plan view of the motorcycle of FIG. 1.

FIG. 1 is a side view of a motorcycle 1 which is one type of the leisure vehicle according to an embodiment of the present invention. FIG. 2 is a plan view of the motorcycle 1. Turning now to FIGS. 1 and 2, the motorcycle 1 includes a front fork 4 extending substantially vertically with a predetermined caster angle. A front wheel 2, which is a steering wheel, is rotatably mounted to a lower portion of the front fork 4. A bar-type steering handle 5 is attached to an upper portion of the front fork 4 by a steering shaft (not shown). The steering shaft is rotatably mounted to a head pipe 25 forming a frame of the motorcycle 1. The front wheel 2 is steered by the rider's operation of rotating the steering handle 11 to the right or to the left.

A meter unit 6, which is a front communication device, is mounted in front of the steering handle 5 and above a front axle of the front wheel 2. The meter unit 6 includes meters or gauges such as a speed meter that indicates a travel speed of the motorcycle 1, a tachometer that indicates an engine speed of an engine E, a water temperature meter that indicates a temperature of cooling water used to cool the engine E, a neutral indicator lamp, a fuel lamp, and a direction indicator lamp, and has multiplex communication interfaces (not shown) and a control function of the multiplex communication.

A pair of right and left main frames 26 extend rearward to be tilted slightly downward from the head pipe 25. A pair of right and left pivot frames 23 are coupled to rear portions of the main frames 26. A swing arm 15 extends substantially forward and rearward and is mounted to each pivot frame member 23 to be vertically pivotable around a front end portion thereof. A rear wheel 13, which is a drive wheel, is rotatably mounted to a rear portion of the swing arm 15. The engine E is mounted to the main frame 26 and the pivot frame 23 and is positioned between the front wheel 2 and the rear wheel 3, under the main frames 26. A generator 8 is mounted on the left side of a crankcase 27 located at a lower portion of the engine E and is coupled to a crankshaft (not shown). A cowling 28 is mounted to extend from a front portion of the vehicle body to side portions of the vehicle body so as to cover the engine E, etc.

A fuel tank 7 is disposed behind the steering handle 5. A rider's seat 10 which is straddled by a rider is mounted behind the fuel tank 7. A battery 9 is mounted below the fuel tank 7 to be located on a right side region of the vehicle body. Behind the rider's seat 10, a rear fender 29 is mounted above the rear wheel 3, a rear cover 24 is mounted to cover right and left regions of an upper portion of the rear fender 29, and a fellow passenger's seat 11 is mounted over the rear cover 24. A tail lamp 14 is attached to a rear end portion of the rear cover 24. A regulator 12 is mounted on the right side in a space defined by the rear cover 24 and the rear fender 29 and is configured to regulate a voltage of an electric power supplied from the generator 8 to the battery 9. An engine electronic control unit (ECU) 13, which is a rear communication device, is mounted in the space defined by the rear cover 24, the rear fender 29, and the fellow passenger's seat 11 so as to be located under a rear portion of the fellow passenger's seat 11. The engine ECU 13 is configured to control a fuel injection amount, an ignition timing, etc., based on information indicating an air intake amount, a throttle opening degree, etc.

The meter unit 6 is coupled to the engine ECU 13 through a multiplex communication line W1 extending in a longitudinal direction of the vehicle body. As used herein, the term "multiplex communication line" refers to a communication line which allows a number of information to be communicated simultaneously in the form of an electric signal by time multiplexing or by frequency multiplexing. The multiplex communication line W1 extends above a center line L1 in a vertical direction of the motorcycle 1 and through a region on the left side of a center line L2 in a lateral (width) direction of the vehicle body along an inner side of the left main frame 26. The multiplex communication line W1 is positioned to be at least 100 mm or more distance apart from in-vehicle noise sources that emit an electromagnetic wave noise, for example, the generator 8, the battery 9, and the regulator 12. As used herein, the term "center line L1 in the vertical direction" refers to a horizontal line passing through a ½ of a whole height of the vehicle body in a side view, and the term "center line L2 in the lateral direction" refers to a line passing through a center in the lateral direction of the vehicle body in a plan view.

To be specific, as shown in FIG. 1, the generator 8 is disposed under the center line L1 in the vertical direction, whereas the multiplex communication line W1 is disposed above the center line L1. As shown in FIG. 2, the battery 9 is disposed on the right side of the center line L2 in the lateral direction, whereas the multiplex communication line W1 is disposed on the left side of the center line L2. As shown in FIG. 2, the regulator 12 is disposed on the right side of the center line L2, whereas the multiplex communication line W1 is disposed on the left side of the center line L2.

Figure 3:
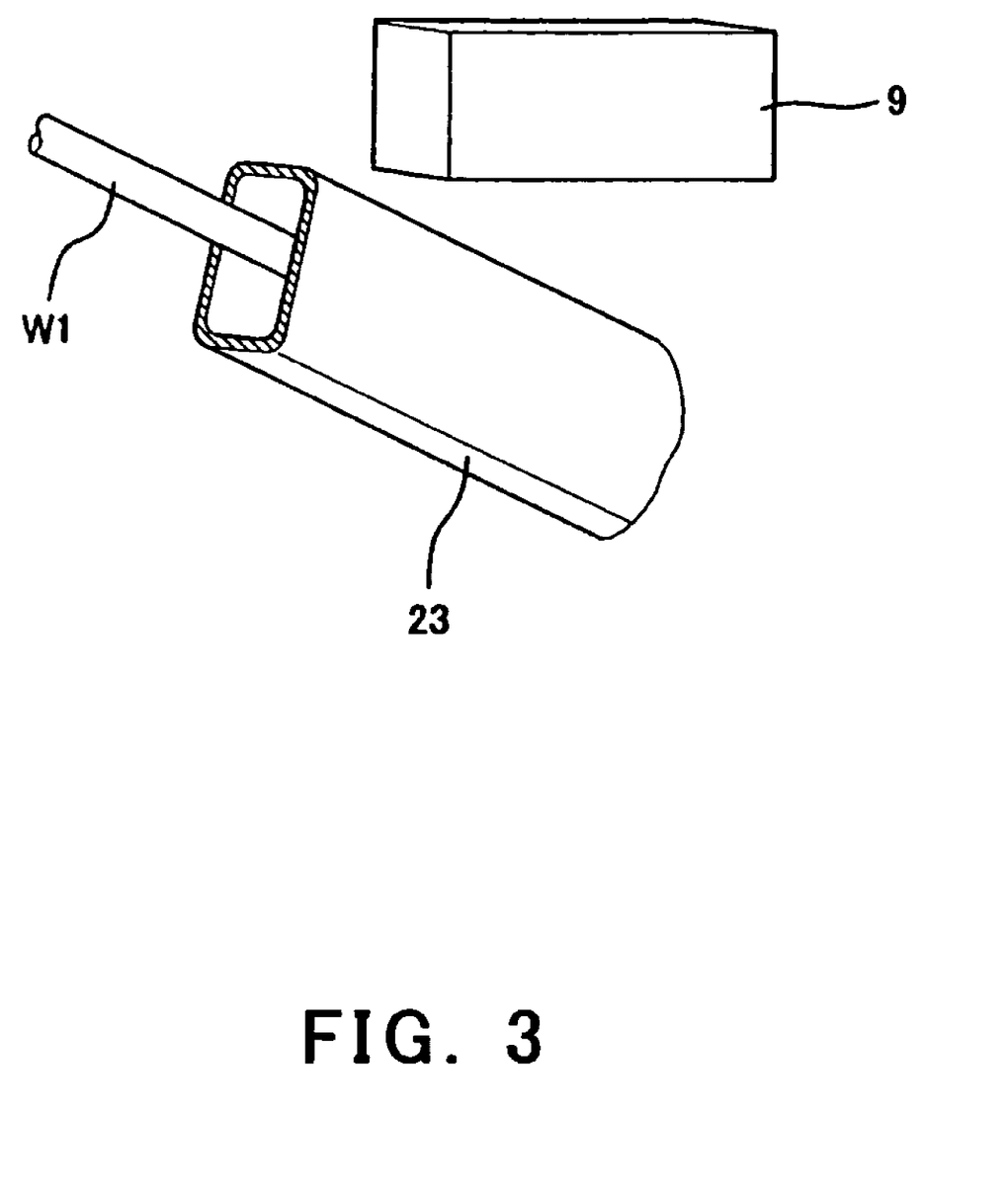
FIG. 3 is an enlarged perspective view showing a region surrounding a battery mounted in the motorcycle of FIG. 1.

FIG. 3 is an enlarged perspective view showing a region surrounding the battery 9 mounted in the motorcycle 1. A part of the communication line W1 is inserted into an inner space of the pivot frame 23 having a closed cross-section in the vicinity of the battery 9. The pivot frame 23 serves to shield a noise emitted from a region located in close proximity to the battery 9, thus improving communication stability of the multiplex communication line W1. A shield plate for improving the communication stability of the multiplex communication line W1 is not intended to be limited to the frame formed of metal but may be other suitable plates such as a metal plate so long as they are able to shield the noise.

Turning again to FIGS. 1 and 2, the generator 8 is coupled to the regulator 12 through a power wire W2. The power wire W2 is guided, through a region under the center line L1, to a region on the right side of the center line L2, and then to a region above the center line L1. The power wire W2 is guided to extend through the right side region of the vehicle body and is coupled to the regulator 12. The regulator 12 is coupled to the battery 9 through a power wire W3 extending through the right side region of the vehicle body on the right side of the center line L2. In this construction, the electric power generated in the generator 8 is sent to the regulator 12 through the power wire W2 and to the battery 9 through the power wire W3 and stored therein.

Figure 4:
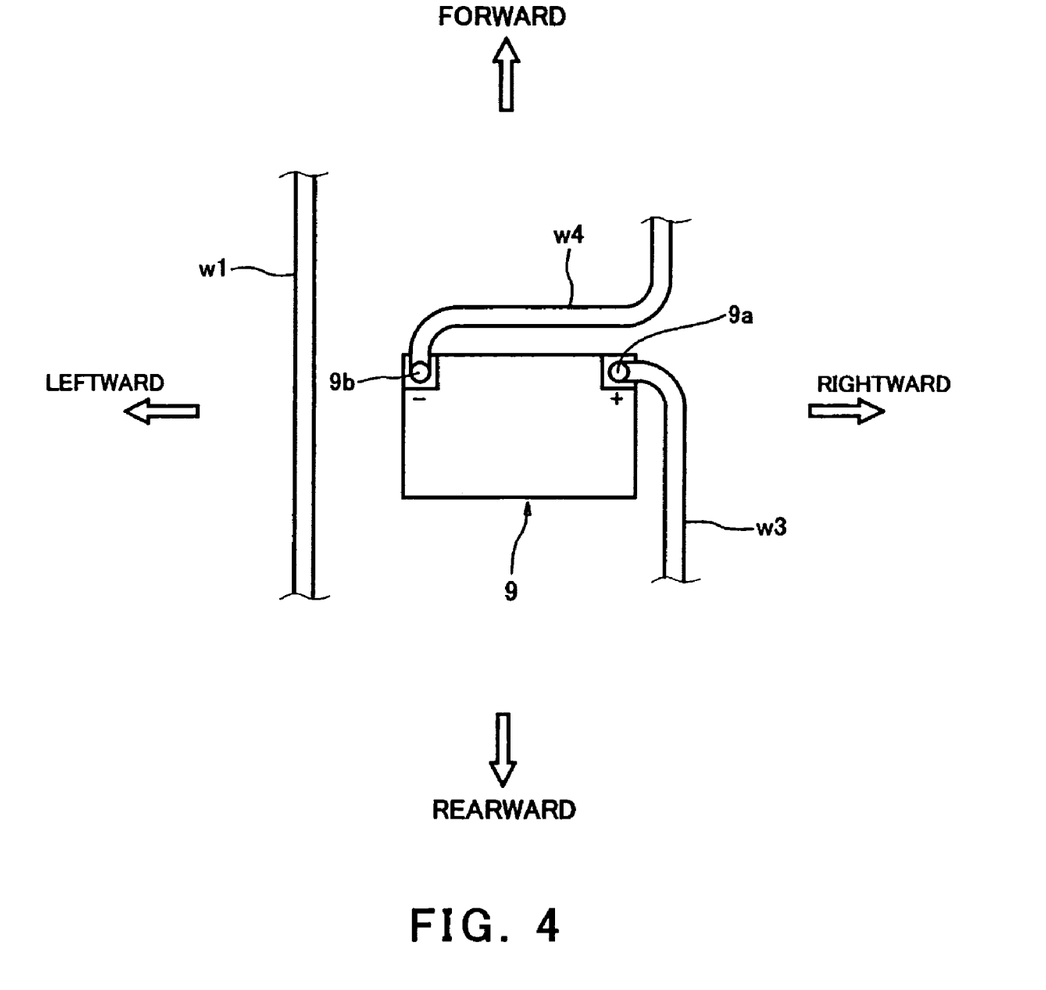
FIG. 4 is a plan view showing a relationship between the battery and a multiplex communication line in the motorcycle of FIG. 1.

FIG. 4 is a plan view showing a relationship between the battery and the multiplex communication line W1. As shown in FIG. 4, the battery 9 is mounted in such a manner that a cathode 9a is positioned rightward relative to an anode 9b in the vehicle body so that the distance between the cathode 9a and the multiplex communication line W1 is larger than the distance between the anode 9b and the multiplex communication line W1. The power wire W3 is connected to the cathode 9a of the battery 9 and is guided to the right in the vehicle body so as to be away from the multiplex communication line W1. An ground wire W4 is connected to the anode 9b of the battery 9 and is also guided to the right in the vehicle body so as to be away from the multiplex communication line W1.

Figure 5:
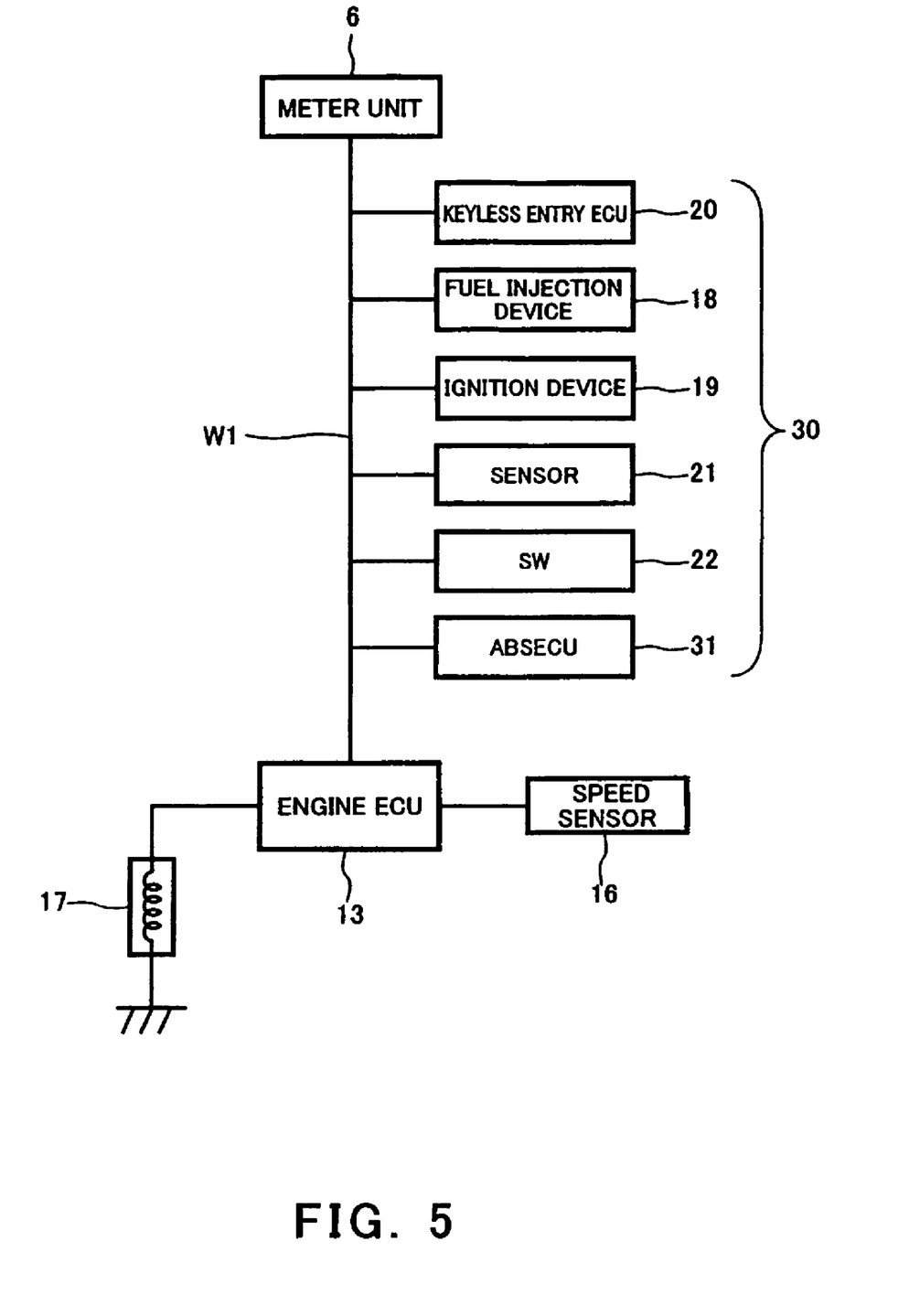
FIG. 5 is a block diagram showing a communication configuration of the motorcycle of FIG. 1.

FIG. 5 is a block diagram showing a communication configuration of the motorcycle 1. As shown in FIG. 5, a fuel injection device 18, an engine ignition device 19, a keyless entry ECU 20 for controlling a keyless entry system, sensors 21, switches 22, an ECU 31 for an anti-lock braking system (ABS), etc., which are intermediate communication devices (node) 30, are arranged in the longitudinal direction of the vehicle body and are coupled to an intermediate region of the multiplex communication line W1 coupling the meter unit 6 to the engine ECU 13. In addition, a speed sensor 16 that detects a travel speed of the motorcycle 1, a water temperature sensor 17 that detects a temperature of the cooling water used to cool the engine E, etc. are coupled to the engine ECU 13. In this manner, in an interior of the vehicle body of the motorcycle 1, an in-vehicle local area network (LAN) is configured by using the multiplex communication line W1, and data communication is carried out by time multiplexing by employing a controller area network (CAN) as a communication protocol. The communication protocol is not intended to be limited to the CAN but may be other suitable communication protocol such as FlexRay, TTP, or Lin.

A network topology of the CAN is a bus topology. All communication devices are coupled onto a bus and are configured to receive data simultaneously, and communication devices other than the associated communication devices are configured to discard the received data. This is called a multicast communication. The network topology may be a star topology or a ring topology. As an access method, a carrier sense multiple access/collision detection (CSMA/CD) method is employed. In the CSMA/CD method, a communication device, which has a desire to transmit data, checks whether or not there is a communication being performed on the bus, and starts data transmission if there is no communication. If signal collision occurs due to simultaneous transmission from plural communication devices, then a communication device with a lower priority halts data transmission and makes a request for re-transmission after an elapse of a certain time.

In the above configuration, since the engine ECU 13 is positioned at a rear portion of the vehicle body so that the multiplex communication line W1 coupling the meter unit 6 to the engine ECU 13 extends from the front portion of the vehicle body to the rear portion of the vehicle body, the intermediate communication devices 30 such as the fuel injection device 18, the engine ignition device 19, the keyless entry ECU 20, the sensors 21, and the switches 22, are coupled to the multiplex communication line W1 efficiently through short lines. In addition, by positioning the engine ECU 13 at the rear portion of the vehicle body, an extra space is formed in the vicinity of the rider's seat 10 because of the absence of the engine ECU, and thus other components can be laid out flexibly. Furthermore, since the communication devices 30 built into the motorcycle 1 share the multiplex communication line W1 to carry out multiplexed data communication, a communication line does not substantially increase in number if the communication devices increase in number. As a result, harness wires can be reduced, and system extensibility can be maintained.

Since the multiplex communication line W1 is positioned on the opposite side of the in-vehicle noise sources such as the generator 8, the battery 9, and the regulator 12, in the lateral direction or in the vertical direction, it is possible to inhibit entry of a noise into a signal to be transmitted through the multiplex communication line W1. Thus, a suitable communication environment is formed in the motorcycle 1. In addition, since the battery 9 is mounted in such a manner that the anode 9b which is connected to the ground is disposed in the vicinity of the multiplex communication line W1 and the cathode 9a is disposed distant from the multiplex communication line W1, the noise associated with the battery 9 does not substantially affect the multiplex communication line W1. Furthermore, since the power line W3 coupled to the cathode 9a of the battery 9 and the ground wire W4 coupled to the anode 9b are guided to the right in the vehicle body so as to be away from the multiplex communication line W1, the noise associated with the power wire W3 and the ground wire W4 does not substantially affect the multiplex communication line W1.

Whereas in this embodiment, the engine ECU 13 is disposed as the rear communication device coupled to the rear end of the multiplex communication line W1, other ECU such as the keyless entry ECU 20 may alternatively be disposed there. In addition, whereas in this embodiment, the multiplex communication line W1 is disposed on the opposite side of the noise sources, it may alternatively be disposed in a position on the same side where it is not subjected to the noise. Furthermore, whereas in this embodiment, the multiplex communication line W1 is positioned to be 100 mm or more distance apart from the noise source so as not to be subjected to the noise, the distance may be determined according to the intensity of the noise.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A motorcycle comprising:
   a plurality of communication devices built into a vehicle body of the motorcycle; and
   a multiplex communication line through which the plurality of communication devices are coupled to each other;
   wherein the communication devices are configured to perform multiplexed data communication though the multiplex communication line; and
   wherein the multiplex communication line is positioned a distance apart from a noise source mounted in the vehicle body so as not to be subjected to a noise; and
   wherein the noise source includes a battery mounted in such a manner that a cathode is located more distant from the multiplex communication line than an anode.

2. The motorcycle according to claim 1, wherein the distance between the multiplex communication line and the noise source is 100 mm or more.

3. The motorcycle according to claim 2, wherein the multiplex communication line is disposed on an opposite side of the noise source with respect to a center line in a width direction of the vehicle body or on an opposite side of the noise source with respect to a center line in a vertical direction of the vehicle body.

4. The motorcycle according to claim 1,
   wherein a part of the multiplex communication line is inserted into an inner space of a noise shield member comprising a vehicle body frame formed of metal having a closed cross-section in a vicinity of the noise source mounted in the vehicle body.

5. The motorcycle according to claim 1, further comprising:
   a generator which is coupled to an engine and configured to generate electric power; and
   a regulator configured to regulate a voltage of the electric power supplied from the generator to the battery; wherein
   the noise source includes the regulator; and
   wherein the multiplex communication line is disposed on an opposite side of the regulator in a lateral direction of the vehicle body.

6. The motorcycle according to claim 1, wherein
   the battery is disposed so as to deviate from a center line in a lateral direction of the vehicle body;
   the multiplex communication line is disposed on an opposite side of the battery with respect to the center line in the lateral direction of the vehicle body; and
   a power wire coupled to the cathode of the battery and an earth wire coupled to the anode of the battery are respectively guided from the cathode and the anode so as to be distant from the multiplex communication line in the lateral direction.

7. The motorcycle according to claim 1,
   wherein the communication devices include a front communication device mounted at a front portion of the vehicle body, a rear communication device mounted at a rear portion of the vehicle body, and an intermediate communication device disposed between the front communication device and the rear communication device; and
   wherein the multiplex communication line extends from the front portion of the vehicle body to the rear portion of the vehicle body between the front communication device and the rear communication device.

8. The motorcycle according to claim 7,
   wherein the front communication device is a meter unit and the rear communication device is an electronic control unit.

9. The motorcycle according to claim 7,
   wherein the rear communication device is mounted in a space defined by a rear fender and a rear cover mounted above a rear wheel.

10. A motorcycle comprising:
    a plurality of communication devices built into a vehicle body of the motorcycle; and
    a multiplex communication line through which the plurality of communication devices are coupled to each other;
    wherein the communication devices are configured to perform multiplexed data communication through the multiplex communication line;
    wherein a part of the multiplex communication line is inserted into an inner space of a noise shield member comprising a vehicle body frame formed of metal having a closed cross-section in a vicinity of a noise source mounted in the vehicle body.

11. A leisure vehicle comprising:
    an engine;
    a battery;
    a generator which is coupled to the engine and configured to generate electric power;
    a regulator which is configured to regulate a voltage of the electric power supplied from the generator to the battery;
    a plurality of communication devices built into a vehicle body of the leisure vehicle; and
    a multiplex communication line through which the communication devices are coupled to each other and which is configured to perform multiplexed data communication;
    wherein the multiplex communication line is disposed on an opposite side of the generator or the regulator which is a noise source in a lateral direction of the vehicle body or in a vertical direction of the vehicle body.

12. The leisure vehicle according to claim 11, wherein the generator is disposed on one side with respect to a center line in the vertical direction of the vehicle body; and the multiplex communication line is disposed on an opposite side of the generator with respect to the center line in the vertical direction.

13. The leisure vehicle according to claim 11, wherein the regulator is disposed on one side with respect to a center line in the lateral direction of the vehicle body; and the multiplex communication line is disposed on an opposite side of the regulator with respect to the center line in the lateral direction.

14. The leisure vehicle according to claim 13, wherein the noise source includes a power wire coupling the regulator to the battery; wherein the power wire is disposed on one side with respect to the center line in the lateral direction; and the multiplex communication line is disposed on an opposite side of the power wire with respect to the center line in the lateral direction.

15. The leisure vehicle according to claim 13, wherein the generator is disposed under a center line in the vertical direction of the vehicle body;

the multiplex communication line is disposed above the center line in the vertical direction and on one side with respect to the center line in the lateral direction, the noise source includes a power wire coupling the generator to the regulator; and the power wire is guided from the generator to an opposite side with respect to the center line in the lateral direction and is coupled to the regulator on the opposite side in a region under the center line in the vertical direction.

16. The leisure vehicle according to claim 13, wherein the regulator is mounted in a space defined by a rear fender and a rear cover which are disposed above a rear wheel.

* * * * *